United States Patent

[11] 3,612,090

[72] Inventor Aaron Kassel
Brooklyn, N.Y.
[21] Appl. No. 880,034
[22] Filed Nov. 26, 1969
[45] Patented Oct. 12, 1971
[73] Assignee Technicon Corporation
Tarrytown, N.Y.

[54] FLOW REGULATOR HAVING NO GAS-LIQUID DIAPHRAGM INTERFACE
13 Claims, 2 Drawing Figs.

[52] U.S. Cl. ....................................... 137/209,
137/412, 137/487.5
[51] Int. Cl. ........................................ G05d 7/06,
G05d 9/12
[50] Field of Search ............................. 356/181;
137/487.5, 485, 486, 41, 395, 398, 392, 386

[56] References Cited
UNITED STATES PATENTS
1,455,795  5/1923  Logan .......................... 137/386 X
1,582,715  4/1926  Wensley ........................ 137/398 X
1,851,422  3/1932  Durando ....................... 137/395
2,213,961  9/1940  Hunter, Jr. .................... 137/392 X
2,540,361  2/1951  Whitley ........................ 137/398
3,507,300  4/1970  Lister .......................... 137/392

Primary Examiner—M. Cary Nelson
Assistant Examiner—Robert J. Miller
Attorney—S. P. Tedesco ABSTRACT: New and improved flow regulator means are provided to maintain the flow of a fluid along a flow path at a substantially constant, predetermined rate and comprise fluid level indicating means, fluid level sensing means operatively associated therewith to generate an electrical signal proportional to the rate of flow of said fluid in said flow path, means to provide a reference or set-point electrical signal, means to amplify the difference between said electrical signals and provide said amplified difference as an output signal, and means to apply said output signal to electromechanically operable, variable flow area flow controller means to control the flow resistance thereof and accordingly control the flow rate of said fluid in said flow path.

PATENTED OCT 12 1971 3,612,090

INVENTOR
AARON KASSEL
BY
*James J. Romano*
ATTORNEY

FLOW REGULATOR HAVING NO GAS-LIQUID DIAPHRAGM INTERFACE

BACKGROUND OF THE INVENTION

1. Field of the Invention

This invention relates to a new and improved flow regulator which is particularly adaptable to the regulation of fluids at low flow rates to maintain the same substantially constant.

2. Description of the Prior Art

Although a wide variety of closed loop flow regulators are known for the regulation of fluid flow to maintain the same at a predetermined, substantially constant flow rate, it may be understood that, in general, the same have been found to be decidedly unsatisfactory for use in improved versions of substantially constant flow rate, automatic fluid sample analysis means in the nature of those shown and described in U.S. Pat. No. 3,241,432, issued Mar. 22, 1966 to Leonard P. Skeggs, et al., which are operable at substantially reduced fluid sample flow rates and fluid sample volumes, respectively, and at substantially increased fluid sample analysis rates. This is to say that for use, for example, in such fluid analysis means for the supply of liquids in the nature of corrosive reagents at predetermined, substantially constant, significantly reduced flow rates, the available flow regulators of the prior art have generally been found to be incapable of providing flow regulation with sufficient accuracy, sensitivity, and/or speed of operation to insure the satisfactory maintenance of said substantially constant flow rates.

In some instances, this may be understood to be due primarily to the fact that the said prior art flow regulators comprise one or more air-liquid interface diaphragms or the like which must, of necessity, be made relatively large for flow regulator use at low flow rates to give rise to the problems of poor frequency response with attendant lack of flow regulator sensitivity. Too, for flow regulator use in the regulation of the flow of corrosive fluids, it may be understood that the use of such interface diaphragms or the like can give rise to the problem of diaphragm corrosion, and subsequent failure, if the chemical properties of the diaphragm do not provide for suitable corrosion resistance. In addition, it may be understood that many of the flow regulators of the prior art comprise fluidic components in the nature of fluidic amplifiers which are relatively expensive when compared, for example, to electrical amplifiers, to thus provide for relatively high flow regulator cost.

OBJECTS OF THE INVENTION

It is, accordingly, an object of this invention to provide a new and improved fluid flow regulator for the accurate regulation of fluid flow to maintain the same at a substantially constant, predetermined flow rate in fluid flow systems having relatively low, substantially constant fluid flow rates.

Another object of this invention is the provision of a flow regulator as above which requires no air-liquid interface diaphragm or the like in the construction thereof to thereby maximize the accuracy, sensitivity and reliability of the flow regulator.

Another object of this invention is the provision of a flow regulator as above of somewhat reduced cost.

Another object of this invention is the provision of a flow regulator as above having a wide operational range to thereby render the same readily adaptable, through relatively minor adjustments, to the regulation of a wide variety of different fluids having a wide variety of different fluid flow characteristics.

A further object of this invention is the provision of a flow regulator as above which is particularly adaptable for use in the regulation of the flow of generally corrosive reagents in improved, low flow rate versions of substantially constant flow rate, fluid sample analysis means in the nature of those shown and described in U.S. Pat. No. 3,241,432.

SUMMARY OF THE INVENTION

As disclosed herein, the new and improved flow regulator of the invention is applied to the regulation of the flow rate of a corrosive reagent liquid for supply at substantially constant, predetermined flow rate to an operatively associated, constant flow rate analysis system. The flow regulator comprises pumping means to pump the reagent liquid at substantially constant flow rate through a reference resistor to liquid height indicating means, and pumping means to pump said liquid from said level indicating means through a variable flow resistor to said fluid analysis system. Optical liquid level sensing means are provided to sense the level of said liquid in said level indicating means and to provide an electrical signal which is indicative of the flow rate of the liquid from said level indicating means to said fluid analysis system. This electrical signal, and a set-point or reference electrical signal are applied as the inputs to a differential amplifier, and the output from the latter is applied to electromechanical means which are arranged to operate said variable flow resistor to vary the flow resistance thereof, and accordingly the liquid flow rate therethrough, in accordance with the output of said differential amplifier means. As a result, variations from said predetermined flow rate in the flow rate of said liquid from said liquid level indicating means will be sensed by said liquid level sensing means, and said electromechanical means operated accordingly to modify said variable flow resistance and restore said flow rate to said predetermined level thereof.

DESCRIPTION OF THE DRAWINGS

The above and other objects and significant advantages of this invention are believed made clear by the following detailed description thereof taken in conjunction with the accompanying drawings wherein.

DETAILED DESCRIPTION OF THE INVENTION

Figure 1:
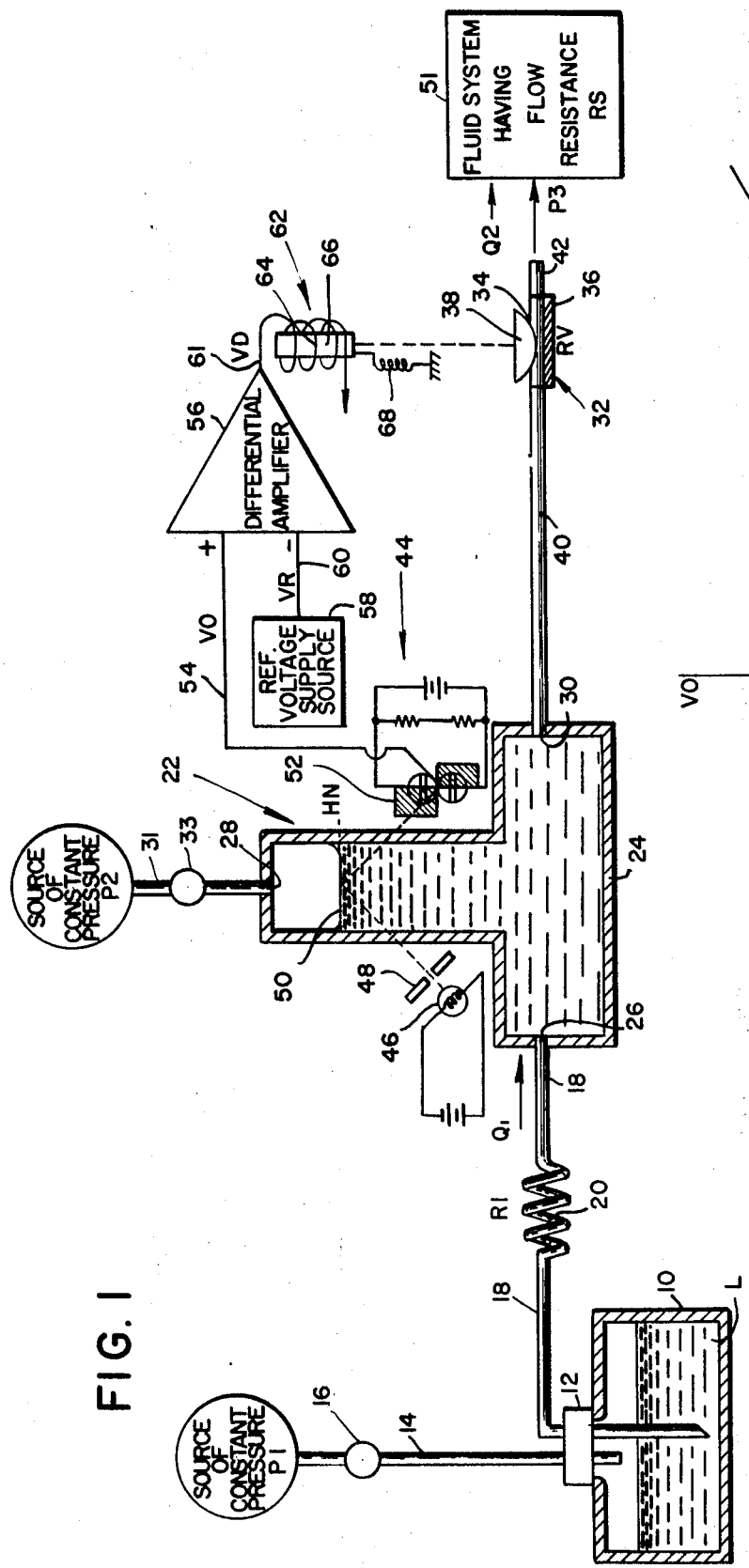
FIG. 1 is a generally schematic diagram depicting a new and improved flow regulator constructed in accordance with the teachings of this invention.

Referring now to FIG. 1, a pressure container is indicated at 10 and comprises cap means 12 which are readily removable therefrom to enable the periodic replenishment of the liquid "L" contained therein. An inlet conduit 14 extends as shown from a source of any suitable pressurization fluid in the nature, for example, of nitrogen at constant pressure P1, through pressure regulator means 16 to and through the cap means 12 to within the pressure container 10 to pressurize the latter substantially at said constant pressure P1. An outlet conduit 18 extends as shown through the cap means 12 of pressure container 10 in such manner that the inlet end thereof is disposed adjacent the bottom of said pressure container, and a precisely calibrated, temperature stabilized reference resistor 20, having a flow resistance R1, is connected as shown in the outlet conduit 18.

Liquid level indicating means are indicated generally at 22 and comprise a generally T-shaped height tube 24 having respective fluid inlets 26 and 28, and a fluid outlet 30. The outlet end of outlet conduit 18 is connected as shown to inlet 26 of the height tube 24, while a conduit 31 extends as shown from another source of any suitable pressurization fluid again in the nature, for example, of nitrogen at constant pressure P2, through pressure regulator means 33 into connection with the other height tube inlet 28.

A flow controller is indicated generally at 32 and, as depicted in FIG. 1, may be seen to take the form of a mechanically variable flow resistor. More specifically, said flow controller comprises a length 34 of any suitable resilient and corrosion resistant tubing in the nature, for example, of Tygon, which is supported as shown from a fixed base member 36, and the flow area of which may be readily varied through compression thereof by tube compression means as indicated schematically at 38 against said fixed base member as should be obvious.

A conduit 40 extends as shown to connect the outlet 30 of the height tube 24 to the inlet of the variable flow area tubing 34, while the outlet of the latter is connected as shown by an outlet conduit 42 for supply of the liquid L from the flow regulator of the invention at substantially constant flow rate as indicated to an operatively associated fluid system 51 at a pressure P3.

By the above arrangement is believed made clear that a pressure pumping system has been provided wherein the liquid L will be pumped from the pressure container 10 through reference resistor 20 to the height tube 24 at substantially constant flow rate Q1 which will be equal to the substantially constant difference between pressure P1 and pressure P2 divided by the flow resistance R1 of reference resistor 20; or $Q1=P1-P2/R1$. In like manner, it is believed clear that the liquid L will be pumped from the height tube 24 through the flow controller 32 to the fluid system 51 at a flow rate Q2 which will be equal to the difference between pressures P2 and P3 as divided by the flow resistance RV of the variable resistor 34; or $Q2=P2-P3/RV$.

It is, of course, the primary function of the new and improved flow regulator of the invention to maintain Q2 constant and substantially equal to Q1 despite variation in the flow resistance RS of the fluid system 51, and it is believed clear that this may readily be effected through appropriate variation in the flow resistance RV of the variable resistor 34 to compensate for such changes in said fluid system flow resistance RS, and it is additionally believed clear that maintenance of the height of the liquid L within the height tube 24 at a predetermined normal operating height HN may be utilized to insure that $Q2=Q1$. This is to say that since the liquid L is substantially incompressible, it may be understood that maintenance of the liquid height at the HN level will insure that the same volume of liquid is flowing from the height tube 24 per unit time through conduit 40 as is entering the former per corresponding unit of time through conduit 18, to thus insure that Q2 remains substantially equal to Q1 as should be obvious.

Further included in the new and improved flow regulator of the invention are liquid level sensing and signal generation means as generally indicated at 44 and which comprise a light source 46, and slit-forming means 48 cooperatively associated therewith as shown to provide a substantially collimated beam of light for impingement upon, and substantially total internal reflection from, the underside of the meniscus 50 of the liquid L within the height tube 24. Reflected light beam detecting means are provided to detect the position of the internally reflected collimated light beam and, as depicted in FIG. 1, take the form of a split cadmium sulfide photocell 52 which is disposed as shown relative to the light source 46 and the height tube 24 to detect the position of said internally reflected light beam, and is connected as shown in the depicted cell energization circuit to provide an output voltage VO on line 54 which is indicative of the position of said internally reflected light beam.

Figure 2:
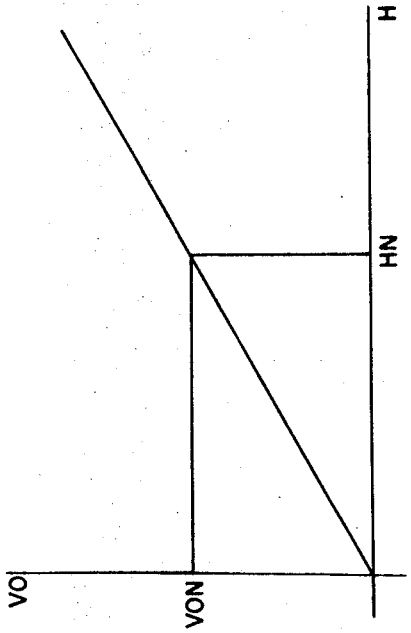
FIG. 2 is a graph depicting the relationship between the voltage output of the liquid height sensing means and the liquid height in the height tube of the flow regulator of FIG. 1.

More specifically, and referring now in addition to the graph of FIG. 2 which plots the voltage output VO of the photocell 52 against the height H of the liquid L in the height tube 24, and makes clear the precisely linear relationship therebetween, it may be understood that the said photocell is arranged to provide a normal operating output voltage VON when said liquid level is at the normal operating height HN to cause said reflected light beam to be positioned as shown to impinge upon the central area of the cell; to provide a proportionally reduced output voltage VO when said liquid level falls below said normal operating height HN to cause said reflected light beam to be positioned to impinge upon the lower area of the cell; and to provide a proportionally increased output voltage VO when said liquid level rises above said normal operating height HN to cause said reflected light beam to be positioned to impinge upon the upper area of the photocell 52, respectively. Accordingly is believed made clear that liquid level detection and signal generation means are provided which will function to provide an output voltage VO which is precisely and directly proportional to the level of the liquid within the height tube 24, and accordingly to the flow rate Q2 and that provision is additionally made to insure that both increases and decreases in said liquid level relative to said normal operating height HN will be accurately reflected in proportional increases or decreases in said output voltage VO relative to said normal operating output voltage VON.

A differential amplifier is indicated at 56, and line 54 is connected thereto as shown to apply the photocell output voltage VO as one input to the said amplifier. A set-point or reference voltage supply source is indicated schematically at 58, and a line 60 is provided to apply the set-point or reference voltage VR to the amplifier 56 as the other amplifier input. Preferably, and for reasons made clear hereinbelow, said source 58 is arranged so that the voltage supplied therefrom is readily adjustable. With this arrangement, it may be understood that the amplifier 56 will function to amplify the difference between said set-point or reference voltage VR and the output voltage VO of the photocell 52 to provide an amplified voltage difference VD equaling VR−VO as an amplifier output voltage on line 61.

An electromechanically operable device which may, for example, take the form of a solenoid, is indicated generally at 62 and comprises a coil 64 and an armature 66 operatively associated therewith. Biasing means as indicated at 68 are provided to bias the armature 66 upwardly of the coil 64 in conventional manner. The amplified voltage difference or output voltage VD of the differential amplifier 56 is applied as shown to the coil 64 to enable the precise control of the position of the armature 66 relative to said coil in accordance with said output voltage as should be obvious. The armature 66 is in turn mechanically connected to the tube compression means 38, as indicated by the dashed line extending therebetween, to enable the precise control of the position of said tube compression means, and accordingly of the flow area and flow resistance RV of the variable resistor 34, in accordance with the position of said armature, whereby is believed made clear that the said flow resistance RV may be precisely controlled through appropriate variation in said amplifier output voltage VD.

In operation for use, for example, in the supply of a corrosive liquid reagent at a predetermined, substantially constant relatively low flow rate in the order of 0.01 ml. per minute to an associated fluid system 51 which takes the form of an improved version of automatic blood sample analysis means in the nature of those shown and described in said U.S. Pat. No. 3,241,432, it may be understood that the liquid L would be constituted by said reagent. In addition, the set-point or reference voltage VR applied to differential amplifier 56 from reference voltage supply source 58 would be adjusted relative to the expected voltage output VO—which will be applied to said differential amplifier on line 54 from the photocell 52 in response to the liquid level in height tube 24 being substantially at the normal operating height HN—to provide a desired amplified voltage difference or output voltage VD on line 61. Application of this amplified voltage difference or output voltage VD to the coil 64 will in turn provide for the positioning of tube compression means 38 in such manner that the flow resistance RV of the variable resistor 34 will be such as to establish Q2 as substantially equal to Q1. For such use, it may be understood that the height tube 24, the light source 46, the split cadmium sulfide photocell 52, the differential amplifier 56, the solenoid 62, the tube compression means 38, and the variable resistor 34 will be relatively arranged so that the latter will function to provide a normal operating flow resistance RVN at a position of said tube compression means intermediate the operational range thereof whereby the same can function to both increase and decrease the said flow resistance RV in response to decreases and increases in the liquid level H in the height tube 24 to thus enable appropriate compensation for increases or decreases in the flow resistance RS of the associated fluid system 51.

More specifically, under normal operating conditions as based upon a normal fluid system flow resistance RSN, the flow regulator of the invention would be arranged so that the normal operating height HN of the liquid in height tube 24 would provide a normal photocell output voltage VON to the differential amplifier 56 of such magnitude that the voltage difference VD to be applied to the coil 64 would insure the provision of a normal operating resistance RVN by the flow resistor 34 and attendant substantial equality between Q1 and Q2.

By way of illustration, if it is assumed, for example, that a temporary increase in the flow resistance RS of the fluid system 51 occurs, it may be understood that this will be rapidly manifested by a temporary decrease in Q2 with attendant temporary increase in the height H of the liquid in the height tube 24. This will in turn result in a temporary increase in the photocell output voltage VO with attendant decrease in the amplified voltage difference or output voltage VD, upward movement of the armature 66 under the action of the biasing means 68, and attendant upward movement of the tube compression means 38 to decrease the extent to which the variable flow resistor 34 is compressed with resultant decrease in RV and increase in Q2 until the latter is once again made substantially equal to Q1. It is, of course, believed clear that once the flow resistance RS of the fluid system returns to normal, this will in turn result in the rapid return of the liquid level in height tube 24 to the normal operating height HN with resultant return of the tube compression means 38 to the normal operating position thereof and return of the flow resistance RV of the variable flow resistor 34 to the normal operating value thereof.

Conversely, it may be understood that a temporary decrease in the flow resistance RS of the fluid system 51 will result in the said liquid level in height tube 24 falling below the normal operating height HN with attendant decrease in the photocell output voltage VO, increase in the amplified voltage difference VD, and resultant downward movement of the tube compression means 38 to temporarily increase the flow resistance RV of the variable flow resistor 34 to re-effect the desired substantial equality between the respective flow rates Q1 and Q2. Again, the return of the flow resistance RS of the fluid system to the normal operating level thereof will, of course, be manifested in the return of the level of the liquid in the height tube 24 to the normal operating height HN thereof, whereupon the tube compression means 38 will be returned to the normal operating position thereof.

Referring again to FIG. 2, it may be seen that the photocell output voltage VO is proportional to the liquid height H in the height tube 24, whereby is believed made clear that the said output voltage as applied on line 54 to the differential amplifier 56 will be precisely related to the changes in the said liquid height—which changes are, as discussed hereinabove, precisely proportional to the relationship between the respective flow rates Q1 and Q2—to thus insure a high degree of flow regulator accuracy and sensitivity within the operational range thereof.

Of particular advantage with regard to the flow regulator of the invention is the fact that the same completely eliminates the need for diaphragm means or the like at the liquid-air interface to eliminate the problems inherent in the use of diaphragms or the like in low flow rate systems. More specifically, it may be understood that for use at extremely low flow rates, diaphragms must, of necessity, be made relatively large to thus introduce mechanical problems in the nature of diaphragm hysteresis which give rise to poor frequency response and attendant lack of flow regulator sensitivity. In addition, it is believed clear that such diaphragms are, of course, subject to failure to thus limit the reliability of the flow regulator, and that this factor is of particular significance with regard to useage with corrosive liquids in the nature, for example, of corrosive reagents, wherein significant problems may arise with regard to the chemical properties of such requisite interface. Too, the provision of an electrical signal output by the signal generation means 44, and the direct electromechanical coupling of the amplifier output voltage to the variable flow resistor eliminates the need for relatively expensive and somewhat less reliable fluidic amplifier means.

Of additional significance is believed the fact that since it is the difference in pressure between P1 and P2, rather than the particular values thereof, which must be maintained substantially constant, it may be understood that operation of the flow regulator of the system in substantially independent of the volume of the pressure container 10 whereby the flow regulator may be satisfactorily utilized with pressure containers of many different volumes and may, in addition, be satisfactorily utilized with pressure containers 10 of somewhat flexible construction, the respective volumes of which may change during flow regulator operation. Too, it is believed clear that the flow regulator of the invention is particularly adaptable to duplication for use in the supply of a plurality of reagents to an associated fluid system wherein each of said flow regulators may be pressurized from the same pressure sources at P1 and P2.

For use as described hereinabove, it may be understood that the normal operating flow resistance RV of the variable flow resistor 34 would preferably be chosen as larger than the combined flow resistances R1 and RS to insure adequate dynamic range for the flow regulator of the invention. In addition, the set-point or reference voltage source 58 would preferably be factory preset to provide for a desired flow rate Q2 with a specific reagent at a specific pressure difference P1–P2 through a temperature stabilized reference resistor 20 having a fluid flow resistance R1, and a variable resistor 34 having a precisely calibrated, normal operating flow resistance RVN as discussed hereinabove.

Further, it may be understood that proper choice of differential amplifier 56 to provide for appropriate amplification of VR–VO will enable the provision of suitably high flow regulator sensitivity with a frequency response which would be more than adequate for the currently contemplated applications of the flow regulator of the invention. Too, since a very limited degree of movement of the tube compression means 38 will be required for a significant change in the flow area, and accordingly of the flow resistance, of the variable flow resistor 34, it may be understood that the operational range of the flow regulator of the invention will be extremely wide to further significant advantage as should be obvious.

Of additional advantage is believed the fact that the flow regulator of the invention embodies significant versatility in that the same can readily be modified through proper adjustment in the reference voltage VR, and/or change in the flow area of the variable resistor 34 when the same is uncompressed, to accurately control the flow of a wide range of reagents at a wide range of flow rates.

Although disclosed by way of example hereinabove as applied to the regulation of the flow of reagents to automatic fluid analysis systems, it is believed clear that the new and improved flow regulator of the invention is, of course, applicable to the regulation of the flow of a wide variety of liquids other and different than said reagents in a wide variety of fluid systems, other and different than the described fluid system. Too, it is believed clear that the flow controller 32 may take a wide variety of alternative forms in the nature, for example, of a pinch or variable orifice valve, the flow area and flow resistance of which may, of course, be readily controlled through operation of the flow controller operating means 62.

While I have shown and described the preferred embodiment of my invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. A flow regulator for maintaining the flow of fluid in a flow path at a substantially constant rate, comprising means for supplying fluid to said flow path, means disposed along a portion of said flow path and comprising a height tube in which said fluid rises to form a meniscus at a level dependent upon flow rate of said fluid from said portion and along said path, fluid level sensing means for sensing the level of said fluid in said height tube to provide a signal indicative of the rate of flow of said fluid from said portion and along said path, and flow controller means operatively associated with said fluid level sensing means and operable in response to said signal to maintain said fluid flow from said portion and along said path at said substantially constant rate.

2. A flow regulator as in claim 1 wherein, said flow controller means comprise variable flow area means forming another portion of said flow path, and control means operatively associated therewith and operable to control the flow area and flow resistance of said variable flow area means, and accordingly, to control the flow rate of said fluid flowing therethrough.

3. A flow regulator as in claim 2 wherein, said variable flow area means are disposed in said flow path downstream of said liquid level indicating means.

4. A flow regulator as in claim 1 wherein said fluid level sensing means comprise means to optically sense the level of said meniscus in said height tube.

5. A flow regulator as in claim 1 wherein, said means to sense the level of said meniscus comprises means to reflect a beam of light from said meniscus, and means to detect the position of the thusly reflected beam of light.

6. A flow regulator as in claim 5 wherein, said means to detect said reflected light beam position comprise split photocell means for providing an output voltage indicative of the height of said fluid in said height tube.

7. A flow regulator as in claim 6 further comprising, amplifier means, means to apply a reference or set-point voltage to said amplifier means as one input thereof, means to apply said output voltage from said split photocell means as another input to said amplifier means whereby, the output of said amplifier means will be constituted by the amplified voltage difference between said reference voltage and said split photocell means output voltage, respectively.

8. A flow regulator as in claim 6 wherein, said flow controller means comprise variable flow area means forming another portion of said flow path, and control means operatively associated therewith and operable to control the flow area and flow resistance of said variable flow area means, and accordingly, to control the flow rate of said fluid flowing therethrough.

9. A flow regulator as in claim 8 wherein, said control means which vary the flow area of said variable flow area means comprise electromechanical means which are operable in response to the application of said amplified voltage difference thereto from said amplifier means.

10. A flow regulator as in claim 9 wherein, said variable flow area means are disposed in said flow path downstream of said liquid level indicating means.

11. A flow regulator as in claim 7 wherein, said flow controller means comprise variable flow area means forming another portion of said flow path, and control means operatively associated therewith and operable to control the flow area and flow resistance of said variable flow area means, and accordingly, to control the flow rate of said fluid flowing therethrough.

12. A flow regulator as in claim 11 wherein, said control means which vary the flow area of said variable flow area means comprise electromechanical means which are operable in response to the application of said amplified voltage difference thereto from said amplifier means.

13. A flow regulator as in claim 12 wherein, said variable flow area means are disposed in said flow path downstream of said liquid level indicating means.